(12) United States Patent
Barsoba et al.

(10) Patent No.: US 10,177,926 B2
(45) Date of Patent: Jan. 8, 2019

(54) VISUALIZING CONVERSATIONS ACROSS CONFERENCE CALLS

(75) Inventors: Fernando Barsoba, Durham, NC (US); David T. Britt, Greensboro, NC (US); Andrew J. Simmering, Holly Springs, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1262 days.

(21) Appl. No.: 13/361,124

(22) Filed: Jan. 30, 2012

(65) Prior Publication Data

US 2013/0195259 A1 Aug. 1, 2013

(51) Int. Cl.
*H04M 3/42* (2006.01)
*H04L 12/18* (2006.01)
*H04L 29/06* (2006.01)

(52) U.S. Cl.
CPC ...... *H04L 12/1822* (2013.01); *H04L 65/1083* (2013.01); *H04L 65/403* (2013.01)

(58) Field of Classification Search
CPC .. H04M 3/56; H04L 12/1822; H04L 65/1083; H04L 65/403
USPC ................... 379/202.01; 370/260; 348/14.08
See application file for complete search history.

(56) References Cited

U.S. PATENT DOCUMENTS

| | | | |
|---|---|---|---|
| 5,594,859 A * | 1/1997 | Palmer | G06F 3/04847 348/E7.081 |
| 6,404,873 B1 | 6/2002 | Beyda et al. | |
| 7,236,580 B1 | 6/2007 | Sarkar et al. | |
| 7,454,465 B2 | 11/2008 | Manion et al. | |
| 7,693,720 B2 | 4/2010 | Kennewick et al. | |
| 7,765,574 B1 | 7/2010 | Maybury et al. | |
| 7,995,733 B2 | 8/2011 | Geppert et al. | |
| 2002/0085030 A1 | 7/2002 | Ghani | |
| 2007/0203980 A1 | 8/2007 | Andersen | |
| 2007/0299710 A1 | 12/2007 | Haveliwala | |
| 2008/0137831 A1 | 6/2008 | Khorsandi | |
| 2009/0051756 A1 | 2/2009 | Trachtenberg et al. | |
| 2010/0246571 A1 | 9/2010 | Geppert et al. | |
| 2010/0246800 A1 * | 9/2010 | Geppert | G06F 3/04817 379/265.09 |
| 2010/0274796 A1 | 10/2010 | Beauregard et al. | |
| 2011/0268263 A1 * | 11/2011 | Jones | H04M 3/563 379/202.01 |
| 2011/0271212 A1 * | 11/2011 | Jones | H04L 12/1818 715/753 |

(Continued)

FOREIGN PATENT DOCUMENTS

| | | |
|---|---|---|
| CN | 1636384 A | 7/2005 |
| CN | 101867635 A | 10/2010 |

(Continued)

OTHER PUBLICATIONS

Disclosure No. IPCOM000182820D dated May 6, 2009, IP.com Prior Art Database Disclosure, retrieved from the Internet: <http://ip.com/IPCOM/000182820> 2 pgs.

(Continued)

*Primary Examiner* — Simon King
(74) *Attorney, Agent, or Firm* — Cuenot, Forsythe & Kim, LLC

(57) ABSTRACT

A method can include conducting a plurality of related conference calls and generating a visualization for each conference call. The visualizations can be sent to computing devices of participants of the plurality of conference calls concurrently with the plurality of conference calls.

20 Claims, 6 Drawing Sheets

(56) References Cited

U.S. PATENT DOCUMENTS

| | | | | |
|---|---|---|---|---|
| 2011/0271332 A1* | 11/2011 | Jones et al. | | 726/7 |
| 2012/0128146 A1 | 5/2012 | Boss et al. | | |
| 2012/0306993 A1* | 12/2012 | Sellers-Blais | | 348/14.08 |
| 2013/0100237 A1* | 4/2013 | Zeng | | H04N 7/15 |
| | | | | 348/14.08 |
| 2013/0195260 A1 | 8/2013 | Barsoba et al. | | |

FOREIGN PATENT DOCUMENTS

| | | |
|---|---|---|
| CN | 104067603 A | 9/2014 |
| EP | 2043348 A2 | 4/2009 |
| JP | 2006237864 A | 9/2006 |
| JP | 2011041247 A | 2/2011 |
| JP | 2015510716 A | 4/2015 |

OTHER PUBLICATIONS

WIPO Appln. PCT/CA2013/050069, International Search Report, Jun. 7, 2013, 5 pg.

U.S. Appl. No. 13/554,705, Non-Final Office Action, dated Nov. 15, 2013, 12 pg.

U.S. Appl. No. 13/554,705, Non-Final Office Action, dated May 23, 2014, 7 pg.

U.S. Appl. No. 13/554,705, Ex Parte Quayle Office Action, dated Nov. 25, 2014, 4 pg.

U.S. Appl. No. 13/554,705, Notice of Allowance, dated Feb. 11, 2015, 7 pg.

U.S. Appl. No. 13/554,705, Notice of Withdrawal from Issue Under 37 CFR 1.313, Mar. 6, 2015, 2 pg.

U.S. Appl. No. 13/554,705, Non-Final Office Action, dated May 1, 2015, 7 pg.

U.S. Appl. No. 13/554,705, Non-Final Office Action, dated Oct. 8, 2015, 8 pg.

U.S. Appl. No. 13/554,705, Final Office Action, dated Mar. 7, 2016, 10 pg.

U.S. Appl. No. 13/554,705, Examiners Answer, dated Dec. 20, 2016, 8 pg.

* cited by examiner

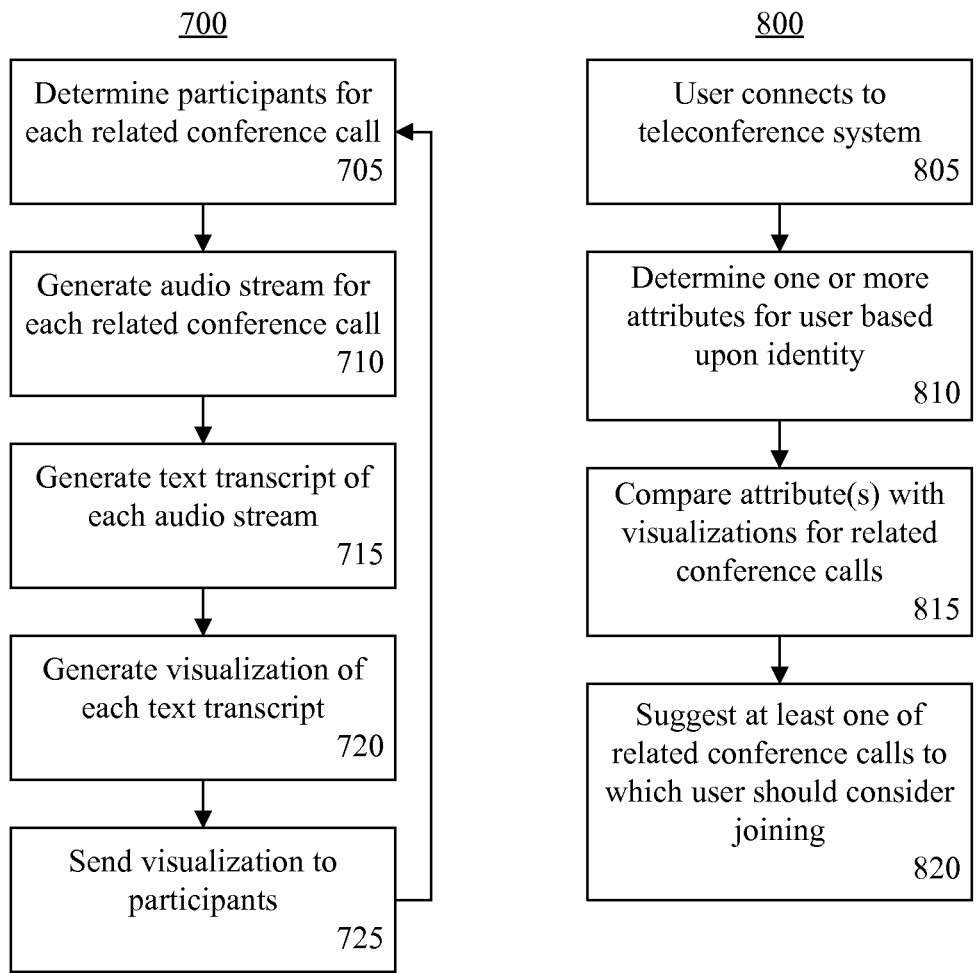

US 10,177,926 B2

VISUALIZING CONVERSATIONS ACROSS CONFERENCE CALLS

BACKGROUND

One or more embodiments disclosed within this specification relate to managing conference calls.

Modern organizations rely heavily upon conference calls as a means of communication and collaboration among people in disparate locations. In some cases, the range of topics discussed in a given conference call may vary widely. To avoid confusion on the conference call, one or more additional conference calls can be initiated. Each additional conference call is started with the intent of continuing discussion in one selected topic from the original conference call. While using multiple conference calls facilitates targeted conversations for multiple topics, sharing information among the conference calls is problematic.

BRIEF SUMMARY

One or more embodiments disclosed within this specification relate to managing conference calls and, more particularly, to visualizing conversations across conference calls.

An embodiment can include a method. The method can include conducting a plurality of related conference calls and generating a visualization for each conference call. The visualizations can be sent to computing devices of participants of the plurality of conference calls concurrently with the plurality of conference calls.

Another embodiment can include a method. The method can include conducting a first conference call and a second conference call, wherein the first conference call and the second conference call are related. A first text representation of the first conference call can be generated. A second text representation of the second conference call can be generated. The first text representation can be sent to a computing device of each participant of the second conference call.

Another embodiment can include a system. The system can include a processor configured to initiate one or more executable operations as described within this specification.

Another embodiment can include a computer program product. The computer program product can include a computer readable storage medium having computer readable program code embodied therewith. The computer readable program code can be configured to implement one or more executable operations as described within this specification.

BRIEF DESCRIPTION OF THE SEVERAL VIEWS OF THE DRAWINGS

FIG. 7 is a flow chart illustrating a method of providing visualizations in accordance with another embodiment disclosed within this specification.

FIG. 8 is a flow chart illustrating a method of joining a conference call in accordance with another embodiment disclosed within this specification.

DETAILED DESCRIPTION

Figure 1:
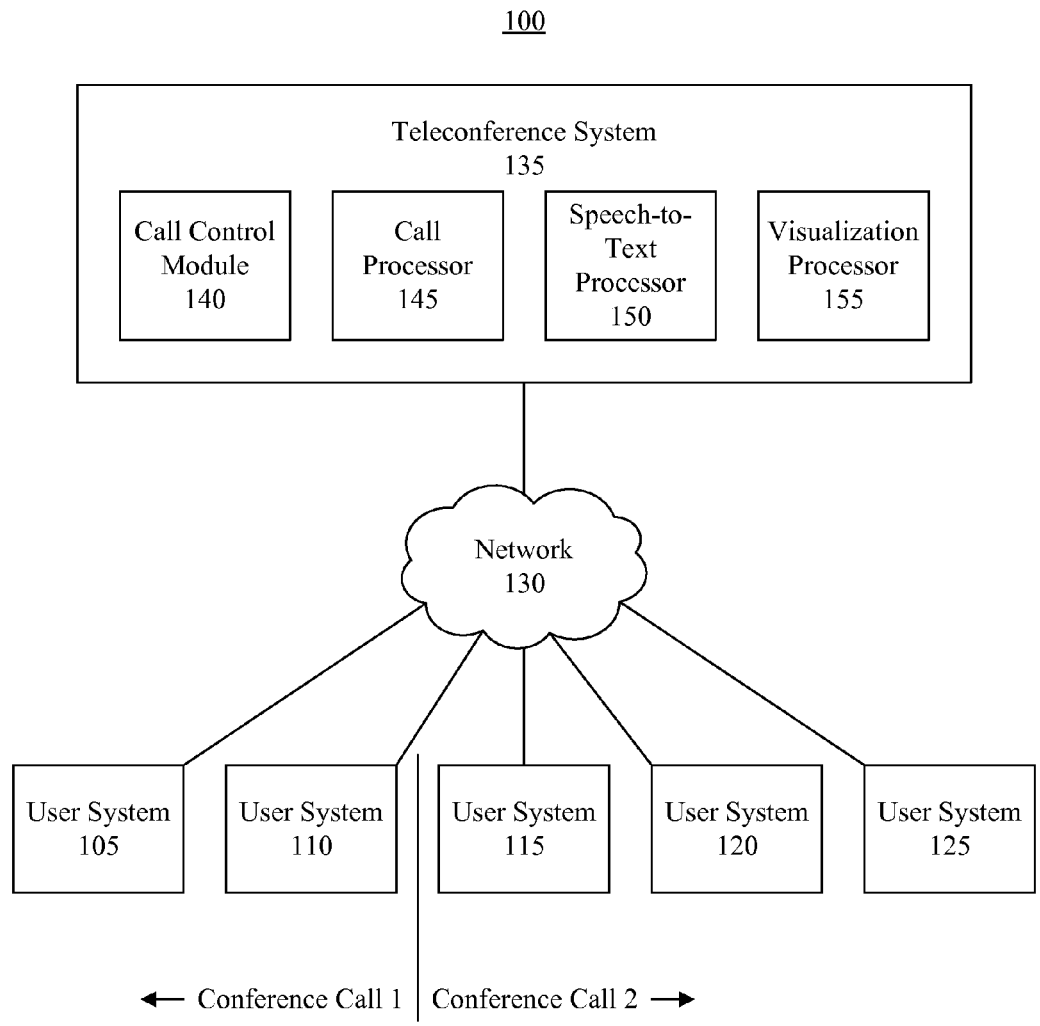
FIG. 1 is a block diagram illustrating a system for conducting conference calls in accordance with an embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts and/or block diagram block or blocks.

One or more embodiments disclosed within this specification relate to managing conference calls and, more particularly, to visualizing conversations across conference calls. In accordance with the inventive arrangements disclosed within this specification, a visualization of the conversation taking place within each of a plurality of conference calls can be provided to participants of the plurality of conference calls. While the conference calls are ongoing, each participant can view the visualization for multiple ones of the plurality of conference calls. The visualizations, for example, can indicate subject matter of conversations taking place among the participants in the respective conference calls in real time or in near real time.

Each participant can utilize a computing device to view the visualizations. Further, each participant can invoke conference call administrative functions through the computing device. In this regard, each participant not only can visually monitor conversations taking place within, e.g., across, each of the plurality of conference calls, but also can manage the particular conference call(s) to which the participant is joined by way of the computing device.

FIG. 1 is a block diagram illustrating a system 100 for conducting conference calls in accordance with an embodiment disclosed within this specification. As shown, FIG. 1 illustrates a plurality of user systems 105, 110, 115, 120, and 125, each communicatively linked to a teleconference system 135 through a network 130. For purposes of discussion, the term "user" and "participant" may be used interchangeably within this specification from time-to-time. Further, a reference to a particular user or participant can be used as a means to refer to the user system associated with, or used by, the referenced user. Similarly, a reference to a particular user system can be used as a means to refer to the user or participant associated with the referenced user system.

Continuing with FIG. 1, each user system 105-125 can be associated with a particular participant. In general, each user system 105-125 can be representative of a computing device and a telephone for the participant associated therewith. The computing device of each user system 105-125 can execute program code, e.g., an application, through which visualizations of conference calls can be presented. Further, each participant can issue requests relating to conference call administration through the computing device of the user system. The telephone of each user system 105-125 can be configured to play audio from teleconference system 135 to the participant, capture audio from the participant, and send the audio to teleconference system 135. The telephone of a user system can function as the mechanism by which the participant actually participants in one or more conference calls as described within this specification.

It should be appreciated that the computing device and the telephone of each of user systems 105-125 can be embodied in any of a variety of different forms. In one aspect, the computing device can be implemented independently of the telephone. For example, the computing device can be implemented as a computer, whether a desktop computer, a tablet computer, or a portable laptop type computer. Accordingly, the computing device can be communicatively linked to teleconference system 135 via the Internet, a WAN, a LAN, or some combination thereof as represented by network 130. The telephone can be implemented as an analog telephone. In that case, the telephone can be communicatively linked to teleconference system 135 via the Public Switched Telephone System (PSTN), for example. The telephone also can be implemented in the form of a voice-over-Internet-Protocol (VOIP) telephone. In that case, the telephone also can be coupled to teleconference system 135 via the Internet, a WAN, a LAN, and/or the PSTN as represented by network 130.

In another aspect, the computing device and the telephone can be implemented as a single device. For example, the computing device can be any of a variety of computing devices while the telephone can be implemented in the form of a software phone executing on the computing device. Similarly, the computing device can be implemented in the form of a smart phone, e.g., executing a client application, and the telephone can be implemented as the mobile phone portion of the smart phone. Appreciably, when using a mobile phone, the mobile phone can be communicatively linked to teleconference system 135 via a mobile communications network also represented by network 130.

The various examples presented within this specification are for purposes of illustration only and, as such are not intended to limit the embodiments disclosed herein. For example, a participant can utilize a smart phone as the computing device while still using an analog telephone or separate VOIP phone in combination as a user system.

As shown, user systems 105 and 110 are joined to a first conference call, referred to as "conference call 1," conducted by teleconference system 135. User systems 115-125 are joined to a second and different conference call, referred to as "conference call 2," conducted by teleconference system 135. For purposes of discussion, conference call 1 and conference call 2 can be considered related conference calls.

In one aspect, conference call 2 can be a conference call that was initiated from conference call 1. Conference call 1, for example, can be a primary conference call and conference call 2 can be a secondary conference call, also referred to as a "breakout" conference call in that the participants of conference call 2 are a subset of the participants initially involved in conference call 1. In this sense, conference call 1 and conference call 2 can be considered related. Each additional conference call initiated from either conference call 1 or conference call 2 also can be considered a related conference call as each of the resulting conference calls is derived from, or relates back to, a same primary conference call, e.g., conference call 1 in this example.

Teleconference system 135 can include a plurality of different modules. In one aspect, teleconference system 135 can be implemented in the form of one or more computer systems, e.g., servers or the like, executing computer program code configured to perform the functions described within this specification. Teleconference system 135 can include a call control module 140, a call processor 145, a speech-to-text (STT) processor 150, and a visualization processor 155.

Call control module 140 can be configured to receive requests from computing devices of participants joined in conference calls. For example, referring to FIG. 1, call control module 140 can receive requests specifying conference call administration instructions from computing devices of user systems 105-125. Call control module 140, responsive to a request, can send commands to call processor 145 to execute and/or implement the operations necessary to implement the request received from a participant, e.g., a participant of conference call 1 or conference call 2.

In general, call processor 145 can be configured to manage the audio stream to and from each of the participants corresponding to user systems 105-125. In general, call processor 145 can respond to commands received from call control module 140, for example, to implement functions such as combining audio streams to form conference call 1, conference call 2, etc. Call processor 145 also can disconnect a participant from a current conference call to which that participant is joined, connect the participant to a different conference call, initiate a new conference call, or discontinue an existing conference call, responsive to commands from call control module 140.

SST processor 150 can receive audio streams for each of a plurality of conference calls, e.g., related conference calls such as conference calls 1 and 2, and perform speech recognition on each received audio stream. Accordingly, SST processor 150, in general, can output a transcript, e.g., speech recognized text, for each audio stream (each related conference call). Visualization processor 155 can be configured to process the transcript of each conference call and generate a visualization that can include a text representation of the conversation taking place within each respective conference call.

As a participant joins one of the related conference calls, e.g., the primary conference call, the participant can identify himself or herself to teleconference system 135. For example, each participant can call into teleconference system 135 via the telephone of the user system and also connect to teleconference system 135 via the computing device of the user system. For each participant, the voice and data connections can be associated so that teleconference system 135 can correlate the audio stream sent to each respective participant with any visualizations that are generated and sent.

In another embodiment, a directory service or other database that includes a listing of potential participants and/or actual participants in conference call 1 and conference call 2 can be coupled to teleconference system 135. Responsive to determining the identity of a participant, teleconference system 135 can query the directory service to determine one or more attributes of the participant. Examples of attributes can include the role or position of the user, for example, within a company or other organization, an area or subject of expertise, etc. The attribute can be compared with the transcript and/or visualization of each related conference call.

Responsive to any matches between the attribute(s) and the transcript and/or visualizations, teleconference system 135 can suggest one or more conference calls of the plurality of related conference calls for the participant to join. The participant can respond to the suggestion with a selected one of the plurality of related conference calls. Teleconference system 135 can join the participant to the conference call selected by the participant. In another aspect, teleconference system 135 can automatically join the participant to the particular conference call determined to match, or most closely match, the attribute(s) of the participant.

Figure 2:
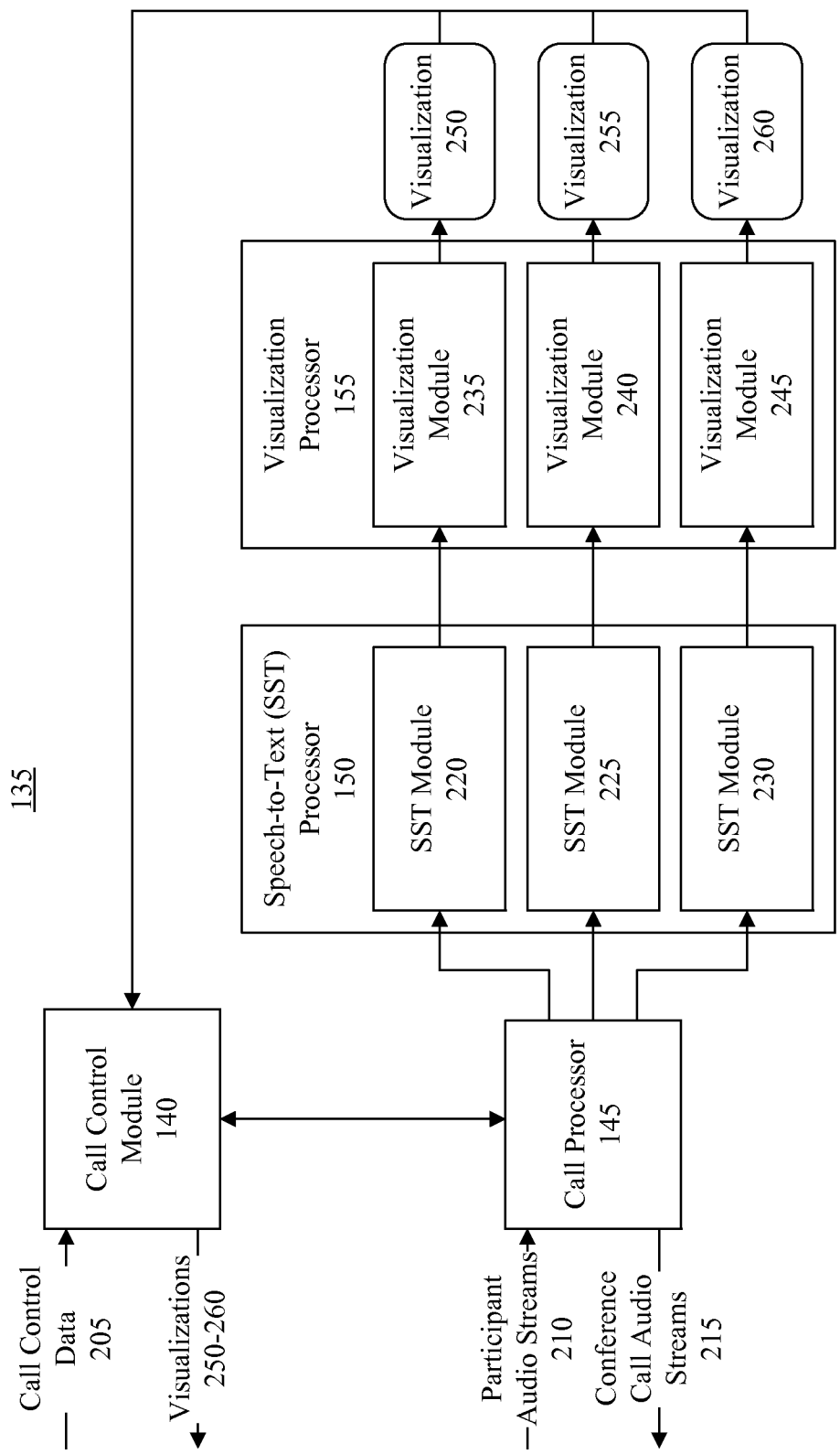
FIG. 2 is a block diagram illustrating the teleconference system of FIG. 1 in accordance with another embodiment disclosed within this specification.

FIG. 2 is a block diagram illustrating teleconference system 135 in accordance with another embodiment disclosed within this specification. FIG. 2 provides an exemplary implementation of teleconference system 135. As such, FIG. 2 is not intended to limit the embodiments disclosed within this specification. Like numbers will be used to refer to the same items throughout this specification.

As noted, teleconference system 135 can be implemented in the form of one or more computing systems or servers as the case may be. As shown, call control module 140 can receive call control data 205 from one or more participants taking part in, or joined to, one of a plurality of related conference calls. Call control data 205 can include one or more conference call administration requests (requests) from one or more of the participants of the plurality of related conference calls. Call control module 140 can interpret the received requests and issue commands to call processor 145 to implement the received requests.

Call processor 145, as shown, can receive one or more participant audio streams 210. Call processor 145 can implement the plurality of related conference calls responsive to commands received from call control module 140 and join various ones of the participant audio streams 210 to different, e.g., selected, ones of the plurality of related conference calls in accordance with the commands received from call control module 140. Call processor 145 further can output conference call audio streams 215 representing the audio for each respective one of the related conference calls to be delivered or distributed to the appropriate participants.

For purposes of illustration, it can be assumed that there are three related conference calls. Accordingly, SST processor 150 includes, e.g., has instantiated, three SST modules 220, 225, and 230. Each of SST modules 220-230 can receive an audio stream of a conference call, e.g., audio for a single conference call. Accordingly, each SST module 220-235 can be configured to generate a text transcript from the received audio stream that can be provided to a respective one of visualization modules 235-245.

Within visualization processor 155, visualization modules 235-245 have been instantiated to process received text transcripts. Each of visualization modules 235-245 can be configured to parse the incoming text transcription of the conversation taking place within a given conference call and generate a respective one of visualizations 250-260. In one example, each of visualizations 250-260 can include a text representation of the received audio stream. Each text representation can be implemented as a text summary, e.g., a processed or shortened version of the text transcript from which the visualization was derived. In one example, each text representation can be implemented as a tag cloud. In another example, each of visualizations 250-260 can include a text representation implemented as a compilation of text fragments, keywords, or the like. Each of visualizations 250-260 represents the conversation taking place in a corresponding one of the related conference calls.

Each of visualizations 250-260 can be provided to a transmission module for sending to each participant or selected participants of the plurality of related conference calls. In the example pictured in FIG. 2, each of visualizations 250-260 can be provided to call control module 140. Call control module 140 can send each of the visualizations 250-260 to each, or selected ones, of the participants of the related conference calls.

In one aspect, the text transcripts and visualizations generated and described with reference to FIG. 2 can be continually updated and changing. For example, rather than generating a static text transcript, the text transcript that is generated and output can be a stream of text that is provided in real time, or near real time, as the SST modules continually operate upon received audio streams. Similarly, the visualizations generated can be continually updated or changing representations of the conversation taking place in each respective conference call in real time or in near real time. In this regard, the state of a visualization reflects the state of the conversation of a given conference call at a particular point in time and changes as the conversation within the conference call changes. As used herein, the phrase "real time" can refer to a level of processing responsiveness that a user or system senses as sufficiently immediate for a particular process or determination to be made, or that enables the processor to keep up with some external process.

It should be appreciated that FIG. 2 is presented for purposes of illustration only. For example, while SST processor 150 and visualization processor 155 were each illustrated to include multiple instances of modules, in another embodiment, a single module or processor, as the case may be, can be configured to process multiple audio streams and/or text transcripts. Such variations can depend upon speed of the computing systems used and the volume or size of the conference calls being managed and/or conducted. Accordingly, the number of instances and the existence of multiple instances are not intended as a limitation of the embodiments disclosed within this specification.

Figure 3:
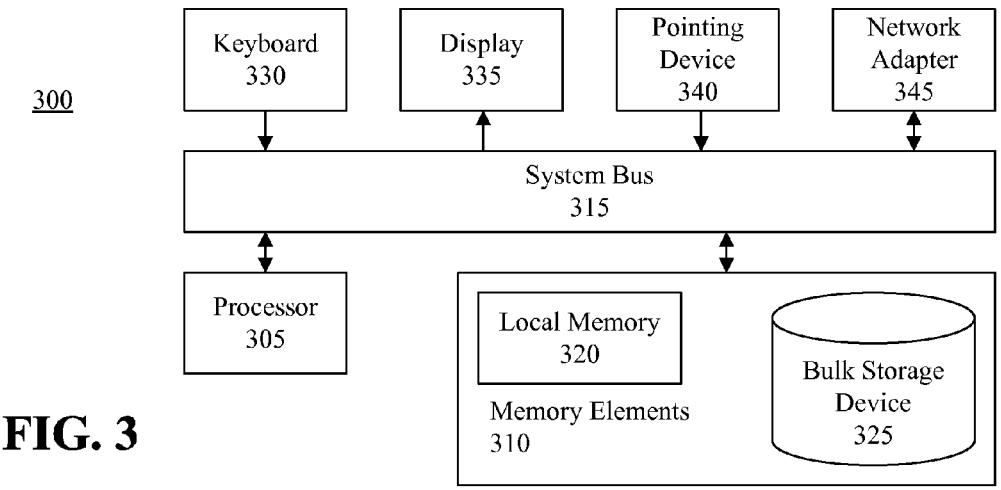
FIG. 3 is a block diagram illustrating an example of a system in accordance with another embodiment disclosed within this specification.

FIG. 3 is a block diagram illustrating an example of a system 300 in accordance with another embodiment disclosed within this specification. In one aspect, system 300 can be representative of the computing devices of each of the various user systems described with reference to FIG. 1. In another aspect, system 300 can be representative of a data processing system implementation of teleconference system 135 of FIGS. 1 and 2, e.g., a server. It should be appreciated that the scale of the components described and the particular operational software and/or application software will differ in system 300 depending upon the use and implementation thereof.

System 300 can include at least one processor 305 coupled to memory elements 310 through a system bus 315 or other suitable circuitry. As such, system 300 can store program code within memory elements 310. Processor 305 can execute the program code accessed from memory elements 310 via system bus 315. In one aspect, for example, system 300 can be implemented as computer that is suitable for storing and/or executing program code. It should be appreciated, however, that system 300 can be implemented in the form of any system including a processor and memory that is capable of performing the functions and/or operations described within this specification.

Memory elements 310 can include one or more physical memory devices such as, for example, local memory 320 and one or more bulk storage devices 325. Local memory 320 refers to random access memory or other non-persistent memory device(s) generally used during actual execution of the program code. Bulk storage device(s) 325 can be implemented as a hard drive or other persistent data storage device. System 300 also can include one or more cache memories (not shown) that provide temporary storage of at least some program code in order to reduce the number of times program code must be retrieved from bulk storage device 325 during execution.

Input/output (I/O) devices such as a keyboard 330, a display 335, and a pointing device 340 optionally can be coupled to system 300. The I/O devices can be coupled to system 300 either directly or through intervening I/O controllers. One or more network adapters 345 also can be coupled to system 300 to enable system 300 to become coupled to other systems, computer systems, remote printers, and/or remote storage devices through intervening private or public networks. Modems, cable modems, wireless transceivers, and Ethernet cards are examples of different types of network adapters 345 that can be used with system 300.

Figure 4:
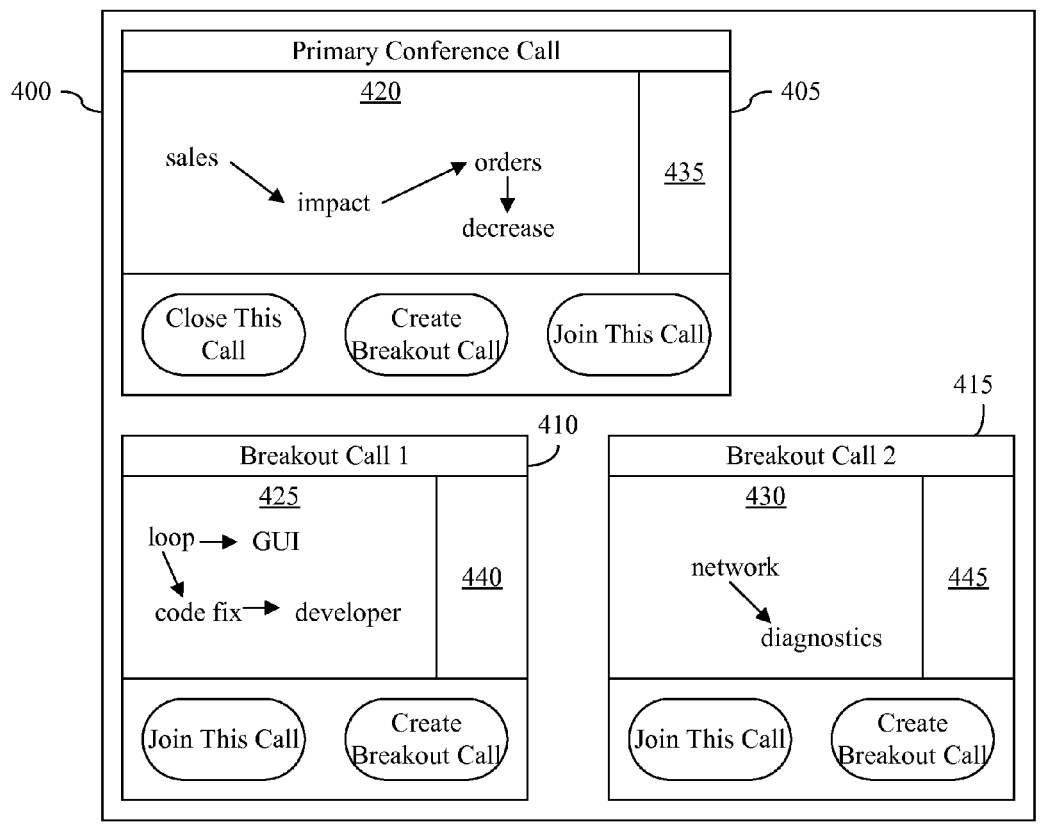
FIG. 4 is a block diagram illustrating a view presented by a user system computing device in accordance with another embodiment disclosed within this specification.

FIG. 4 is a block diagram illustrating a view 400 presented by a user system computing device in accordance with another embodiment disclosed within this specification. View 400 can be presented upon a display of a participant computing device while involved in one of a plurality of related conference calls. In general, data presented within view 400 can be data that is received from the teleconference server, e.g., the call control module, as described with reference to FIGS. 1 and 2.

For purposes of illustration, consider the case in which a primary conference call is ongoing and involves a plurality of participants. At some point, a first breakout call, referred to as "breakout call 1," is started. Several of the participants of the primary conference call leave the primary conference call and are joined to breakout call 1. Further, at some point during the primary conference call, a second breakout call, referred to as "breakout call 2," is started. Breakout call 2 is started from either breakout call 1 or from the primary conference call. As such, the participants of breakout call 2 can be a subset of participants of the primary conference call or of breakout call 1. In any case, the primary conference call, breakout call 1, and breakout call 2 can be considered related conference calls.

View 400 reflects an example of an interface that can be presented to a participant of one of the primary conference call, breakout call 1, or breakout call 2. In one aspect, each participant of a related conference call, i.e., the primary conference call, breakout call 1, and/or breakout call 2, can be presented with view 400 through the participant's computing device. Accordingly, each participant is able to view and monitor the conversation taking place within each other related conference call.

As shown, each conference call is represented within view 400 by a respective one of windows 405, 410, and 415. Each of windows 405-415 can include a region 420, 425, and 430, respectively within which the visualization received from the teleconference server can be displayed for the corresponding conference call. Accordingly, within region 420, the visualization for the primary conference call is displayed. Within region 425, the visualization for breakout call 1 is displayed. Within region 430, the visualization for breakout call 2 is displayed. Each related conference call can be represented by a view presenting a visualization of the call.

Each of windows 405-415 also can include a region 435, 440, and 445, respectively. Each of regions 435-445 can display another aspect of the visualization for the corresponding conference call. Within each of regions 435-445, a list of the participants of each respective conference call can be displayed. Accordingly, within region 435, the participants of the primary conference call can be displayed. Within region 440, the participants of breakout call 1 can be displayed. Within region 445, the participants of breakout call 2 can be displayed. In general, each of windows 405-415 can correspond to one conference call and, thus, the visualization (e.g., one visualization) for that conference call.

As discussed, the visualization presented within each of regions 420-430 can be updated dynamically over time as the conference calls continue to reflect the current state of the conversation. Similarly, the list of participants displayed in each of regions 435-445 can be updated dynamically over time as the conference calls continue and participants move from one conference call to another to accurately reflect the participants in each respective conference call at any given time.

Each of windows 405-415 can include a plurality of controls illustrated as activatable buttons. In general, the "Close This Call" button within window 405 can cause the computing device of the user to send a request to terminate the primary conference call to the teleconference system responsive to selection of the button by a participant. The "Create Breakout Call" button within each of windows 405-415 can cause the computing device of the participant to send a request to create a breakout call to the teleconference system. The teleconference system, responsive to the request, can create a breakout call as instructed.

The "Join This Call" button within each of windows 405-415 can cause the computing device of the user to send a request to the teleconference system for the user to join the particular conference call corresponding to the button selected. For example, responsive to the participant selecting the "Join This Call" button of breakout call 1, the computing device of the participant can send a request to the teleconference system for the participant to join breakout call 1. Responsive to the request, the teleconference system can disconnect the participant from the conference call to which the participant is currently joined, e.g., the primary conference call or breakout call 2, and join the participant to breakout call 1.

As illustrated, with the visualizations and controls provided through view 400, each participant can visually monitor the content, e.g., conversation, of each of the related conference calls and freely move among the related conference calls as desired. In one aspect, specific controls for discontinuing a conference call need not be included. For example, a conference call, whether the primary conference call or one of the breakout calls, can be terminated when there are no participants left in the conference call or, for example, when only one user remains in a conference call. In the latter case, the teleconference system can join the user to the primary conference call or query the user as to which of the related conference calls he or she wishes to join. Participants can exit a particular conference call by disconnecting from the teleconferencing system or by joining a different call.

Figure 5:
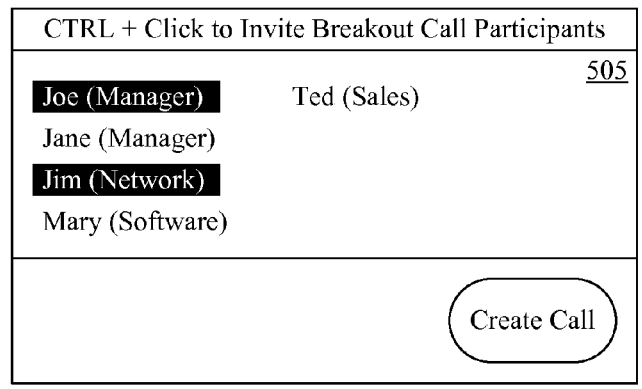
FIG. 5 is a block diagram illustrating a window presented by a user system computing device in accordance with another embodiment disclosed within this specification.

FIG. 5 is a block diagram illustrating a window 500 in accordance with another embodiment disclosed within this specification. Window 500 illustrates an interface that can be presented to a participant by a user system computing device in response to selection of the "Create Breakout Call" button described with reference to FIG. 4.

Using window 500, the participant having selected the "Create Breakout Call" button, can select the particular participants to be included in, or invited to join, the breakout call that is to be created. In one aspect, the list of participants from which one can choose and that are presented in window 500 can be those participants in the particular conference call for which the "Create Breakout Call" button was selected. For example, when the "Create Breakout Call" button corresponding to breakout call 1 is selected, the list of participants shown in region 505 of window 500 can be the participants joined in breakout call 1.

Responsive to selection of the "Create Call" button, the computing device of the participant can send a request to create a new breakout call to the teleconference system. The teleconference system can create a new breakout call and join the selected participants, shown with highlighting, to the newly created breakout call. In one aspect, the participant that requested the breakout call can be automatically included in the breakout call being created. In another aspect, the participant is only included if the participant selects himself or herself from the list of participants available in region 505.

In still another embodiment, the list of participants available to be joined to the new breakout call as presented in region 505 can be each participant across each of the existing, related conference calls. For example, the participants shown in region 505 can include each participant joined to the primary call, breakout call 1, or breakout call 2.

Figure 6:
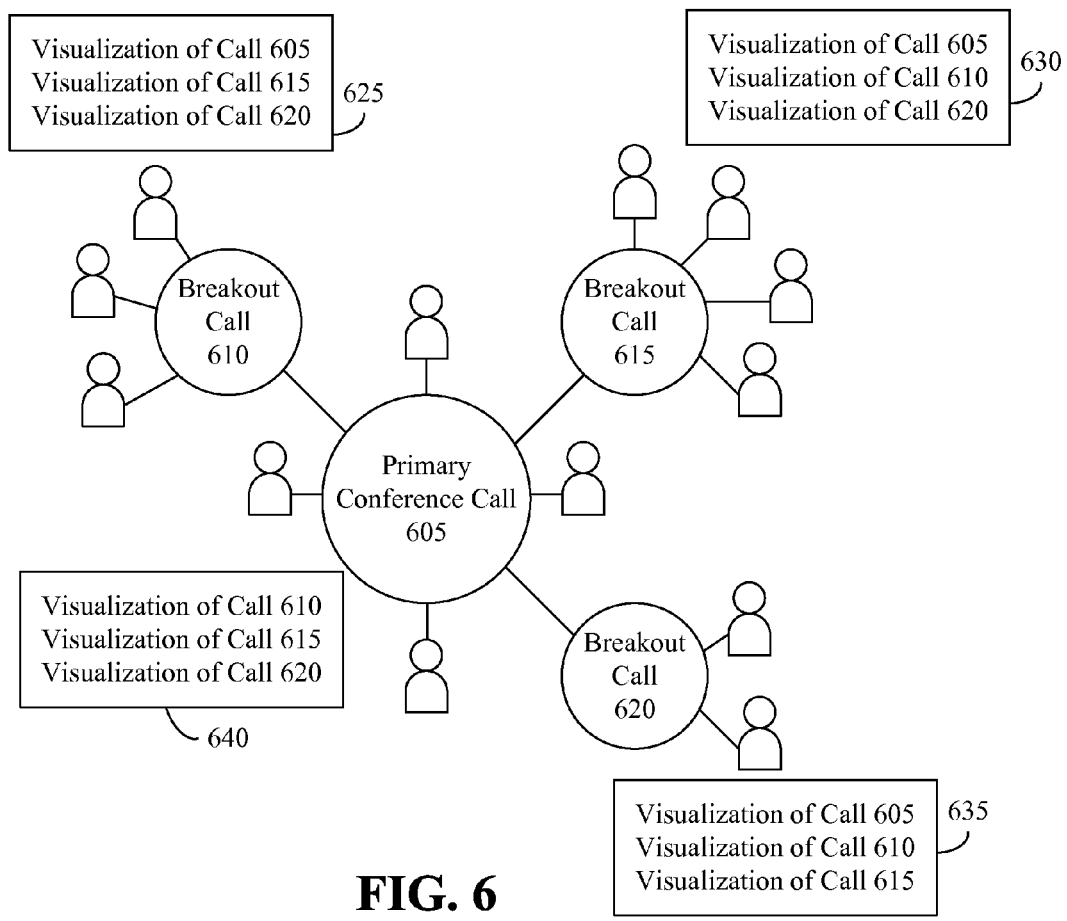
FIG. 6 is a block diagram illustrating operation of the teleconference system of FIG. 1 in accordance with another embodiment disclosed within this specification.

FIG. 6 is a block diagram illustrating operation of the teleconference system of FIG. 1 in accordance with another embodiment disclosed within this specification. As shown, a primary conference call 605 is being conducted along with related conference calls shown as breakout call 610, breakout call 615, and breakout call 620. Each conference call has two or more participants, each being associated with a user system as described.

Each participant of primary conference call 605 can receive visualizations, illustrated in block 640, of other related conference calls. For example, each participant joined to primary conference call 605 can receive a visualization of breakout call 610, a visualization of breakout call 615, and a visualization of breakout call 620. In the embodiment illustrated in FIG. 6, participants do not receive a visualization of the particular conference call to which the participant is currently joined. Accordingly, participants in primary conference call 605 do not receive a visualization of primary conference call 605. As discussed, however, it should be appreciated that a visualization of the particular call in which the participant is currently joined also can be presented so that each participant is able to view a visualization of each related call.

Each participant of breakout call 610 can receive visualizations illustrated in block 625. For example, each participant of breakout call 610 can receive a visualization of primary conference call 605, a visualization of breakout call 615, and a visualization of breakout call 620. Each participant of breakout call 615 can receive visualizations illustrated in block 630. For example, each participant of breakout call 615 can receive a visualization of primary conference call 605, a visualization of breakout call 610, and a visualization of breakout call 620. Finally, each participant of breakout call 620 can receive visualizations illustrated in block 635. For example, each participant of breakout call 620 can receive a visualization of primary conference call 605, a visualization of breakout call 610, and a visualization of breakout call 615.

FIG. 7 is a flow chart illustrating a method 700 of providing visualizations in accordance with another embodiment disclosed within this specification. Method 700 can be performed by a system such as the teleconference system described with reference to FIGS. 1 and 2 of this specification. Method 700 can begin in a state in which a plurality of related conference calls have been initiated and are ongoing.

In step 705, the teleconference system can determine the participants for each related conference call. For example, each participant can connect to the teleconference system via the telephone and the computing device portion of the user systems described herein. In one aspect, the telephone number from which each participant is calling or other identifying information for the audio stream of each participant, can be associated with an address or other identifying information for the computing device of each respective participant, thereby allowing the teleconference system to associate each participant with a telephone and a computing device. This correlation or association allows the teleconference system to send each participant the correct audio stream and the correct visualizations.

In step 710, the teleconferencing system can generate an audio stream for each related conference call. In step 715, the teleconference system can generate a text transcript of each audio stream. In step 720, the teleconference system can generate a visualization of each text transcript. For example, the visualization can be a text summary, a tag cloud, or the like. In step 725, the teleconference system can send the visualizations to the participants of the related conference calls as described. As noted, for each conference call, the visualization can specify a list of participants for the conference call.

FIG. 8 is a flow chart illustrating a method 800 of joining a conference call in accordance with another embodiment disclosed within this specification. Method 800 can be implemented by a system such as the teleconference system described with reference to FIGS. 1 and 2 of this specification. Further, method 800 can begin in a state where a plurality of related conference calls are ongoing.

In step 805, a user can connect to the teleconference system. As noted, the user can connect via telephone and via computing device. For example, the user can attempt to connect to, e.g., call or join, the primary conference call of the plurality of related conference calls.

In step 810, the teleconference system can determine one or more attributes of the user based upon the identity of the user. As discussed, the teleconference system can access a directory service, a database, e.g., a personnel database, or the like. In step 815, the teleconference system can compare the attribute(s) of the user with the transcript and/or the visualization of each of the plurality of related conference calls.

In step 820, the teleconference system can suggest a particular one (or more) of the related conference calls for the user to join. The suggestion can be made via telephone, e.g., using an automated voice response system, or can be presented via the computing device of the user. As discussed, in another embodiment, the teleconference system can automatically join the user to the conference call suggested in step 820. Alternatively, the teleconference system can join the user to a conference call selected by the user, whether the selected conference call is the same as the suggested conference call or not.

In another example, the user can be automatically joined to the primary conference call. Once the user's computing device begins presenting visualizations and conference call administration controls, the user can move to any one of the plurality of related conference calls as described within this specification.

In still another example, the user can join a conference call using the computing device. The user can connect to the teleconference system to receive visualizations of the related conference calls without receiving or first joining the audio portion of one of the calls. Accordingly, the user, via the computing device, can be presented with visualizations of one or more or each of the related conference calls. The user can then select a conference call of the related conference calls, e.g., via an interface as described within this specification, and responsive to that selection, be joined to the selected conference call. More particularly, having selected a particular conference call, the user can be joined to the audio portion of the selected call. The user can move from call to call as described.

Figure 9:
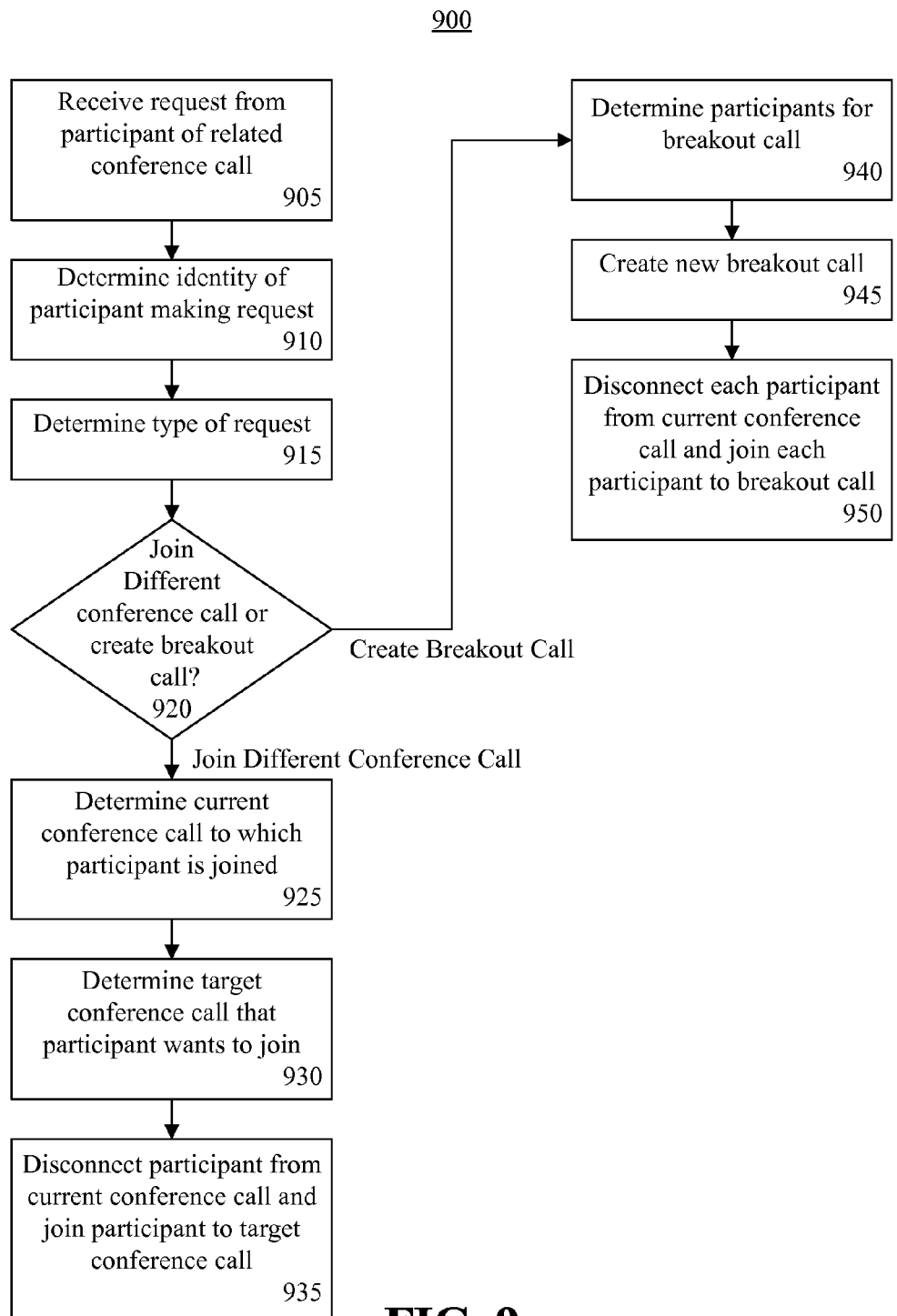
FIG. 9 is a flow chart illustrating a method of conference call administration in accordance with another embodiment disclosed within this specification.

FIG. 9 is a flow chart illustrating a method 900 of conference call administration in accordance with another embodiment disclosed within this specification. Method 900 can be implemented by a system such as the teleconference system described with reference to FIGS. 1 and 2 of this specification. Method 900 can begin in a state where a plurality of participants are connected to the system and participating in a plurality of related conference calls. It should be appreciated that the system can be configured to continually monitor for received conference call administration requests from the participants. Method 900 can begin responsive to receiving such a request.

In step 905, the system can receive a request from a participant of one of the related conference calls. As noted, the participant can initiate a request by activating one of the conference call administration buttons described with reference to FIG. 4. In step 910, the system can determine the identity of the participant making the request.

In step 915, the system can determine the type of the request that was received. For example, the system can determine whether the request is to join a different one of the related conference calls or to create a breakout call. Responsive to determining that the request is to join a different one of the related conference calls, method 900 can continue to step 925. Responsive to determining that the request is to create a breakout call, method 900 can proceed to step 940.

In step 925, the system can determine the current conference call of the plurality of related conference calls to which the participant that issued the request is joined. In step 930, the system can determine the target conference call. The target conference call can be the particular conference call of the plurality of related conference calls that the participant wishes to join. The target conference call can be specified in the request received by the system. In step 935, the system can disconnect the participant from the current conference call and join the participant to the target conference call.

It should be appreciated the teleconference system can update the visualizations that are provided to the requesting participant if need be. For example, in the case where a participant is provided with a visualization of each related conference call, the visualizations sent by the teleconference system to the participant and, thus, received and displayed by the computing system of the participant, will not change. In the case where the participant is not provided with a visualization of the conference call to which the participant is joined, the teleconference system will discontinue sending the visualization of the conference call that the participant left and begin sending the visualization of the target conference call to which the participant was joined.

Continuing with step 940, the teleconference system can determine the participants for the breakout call. The participants can be specified by the requesting participant as discussed with reference to FIG. 5, for example. In step 945, the teleconference system can create or initiate a new breakout call. In step 950, the teleconference system can disconnect each participant identified in step 940 from the conference call (current conference call) to which that participant is joined and join each participant identified in step 940 to the newly created breakout call.

Having created the breakout call as described, the teleconference system can determine the particular visualizations to be provided to each of the participants identified in step 940 and send the correct visualizations as previously described. As noted, visualizations are continuously updated in terms of the text representations and the list of participants included therein.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A teleconference computer hardware system, comprising:
    a hardware processor configured to initiate the following executable operations:
        conducting a first conference call between a plurality of hardware devices connected to the teleconference computer hardware system using a network;
        receiving, from a user associated with a first hardware device of the plurality of hardware devices, a request to join a second conference call that is related to the first conference call;
        joining, based upon the request, the first hardware device to the second conference call;
        disconnecting, in association with the joining, the first hardware device from the first conference call while still conducting the first conference call between other users of the plurality of hardware devices;
        generating computer data that represents visualizations, respectively, of the first and second conference calls; and sending, over the network and to the plurality of hardware devices, the computer data, wherein the plurality of hardware devices are configured to generate, using the computer data, concurrent visualizations of both the first and second conference calls.

2. The system of claim 1, wherein
the request identifies the second conference call as an existing related conference call.

3. The system of claim 1, wherein
the request identifies the second conference as a breakout call to be generated.

4. The system of claim 3, wherein
a determination is made as to at least one additional participant of the breakout call, and the breakout call is generated, after the request is received, between the first hardware device and the at least one additional participant.

5. The system of claim 1, wherein
the respective visualizations of the first and second conference calls represent conversations taking place in the first and second conference calls.

6. The system of claim 5, wherein
the respective visualizations of the first and second conference calls includes text representations of the first and second conference calls.

7. The system of claim 1, wherein
an attribute of the first user is determined;
a recommendation is made, to the first user and based upon the attribute, as to a related conference call to join.

8. The system of claim 7, wherein
the recommendation is based upon a comparison of the attribute to visualizations for related conference calls.

9. The system of claim 7, wherein
the first user is automatically joined to the related conference call based upon the recommendation.

10. The system of claim 1, wherein
the teleconference computer hardware system provides, to the first user, the computer data that represents visualizations of the first and second conference calls without the first user joining audio portions of either the first and second conference calls.

11. A computer program product, comprising:
a hardware storage device having computer readable program code stored therein,
the computer readable program code, which when executed by a teleconference computer hardware system, causes the teleconference computer hardware system to perform:
conducting a first conference call between a plurality of hardware devices connected to the teleconference computer hardware system using a network;
receiving, from a user associated with a first hardware device of the plurality of hardware devices, a request to join a second conference call that is related to the first conference call;
joining, based upon the request, the first hardware device to the second conference call;
disconnecting, in association with the joining, the first hardware device from the first conference call while still conducting the first conference call between other users of the plurality of hardware devices;
generating computer data that represents visualizations, respectively, of the first and second conference calls; and
sending, over the network and to the plurality of hardware devices, the computer data, wherein
the plurality of hardware devices are configured to generate, using the computer data, concurrent visualizations of both the first and second conference calls.

12. The computer program product of claim 11, wherein
the request identifies the second conference call as an existing related conference call.

13. The computer program product of claim 11, wherein
the request identifies the second conference as a breakout call to be generated.

14. The computer program product of claim 13, wherein
a determination is made as to at least one additional participant of the breakout call, and
the breakout call is generated, after the request is received, between the first hardware device and the at least one additional participant.

15. The computer program product of claim 11, wherein
the respective visualizations of the first and second conference calls represent conversations taking place in the first and second conference calls.

16. The computer program product of claim 15, wherein
the respective visualizations of the first and second conference calls includes text representations of the first and second conference calls.

17. The computer program product of claim 11, wherein
an attribute of the first user is determined;
a recommendation is made, to the first user and based upon the attribute, as to a related conference call to join.

18. The computer program product of claim 17, wherein
the recommendation is based upon a comparison of the attribute to visualizations for related conference calls.

19. The computer program product of claim 17, wherein
the first user is automatically joined to the related conference call based upon the recommendation.

20. The computer program product of claim 11, wherein
the teleconference computer hardware system provides, to the first user, the computer data that represents visualizations of the first and second conference calls without the first user joining audio portions of either the first and second conference calls.

* * * * *